United States Patent Office 3,271,402
Patented Sept. 6, 1966

3,271,402
5-HIGHER ALKYL-5-LOWER ALIPHATIC HYDRO-CARBON-2-THIOBARBITURIC ACIDS
Peter Fahrni, Binningen, and Walter Mosimann and Otto Schnider, Basel, Switzerland, assignors to Hoffmann-La Roche Inc., Nutley, N.J., a corporation of New Jersey
No Drawing. Filed Aug. 7, 1962, Ser. No. 215,288
Claims priority, application Switzerland, Sept. 29, 1961, 11,356/61
9 Claims. (Cl. 260—260)

This invention relates, in general, to heterocyclic compounds and to a process for the production thereof. More particularly, the invention relates to substituted thiobarbituric acids having the formula:

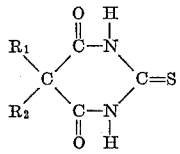

in which $R_1$ represents an alkyl radical having from 11 to 18 carbon atoms, inclusive; and in which $R_2$ represents a lower aliphatic hydrocarbon radical, either saturated or unsaturated; a halogen-substituted lower aliphatic hydrocarbon radical, either saturated or unsaturated; a cyclo-lower aliphatic hydrocarbon radical, either saturated or unsaturated; or a halogen-substituted cyclo-lower aliphatic hydrocarbon radical, either saturated or unsaturated, to medicinally acceptable metal salts of such acids and to processes for producing such acids and salts.

The substituents which, in Formula I, are represented by the symbol $R_1$ are, for example, alkyl groups such as pentadecyl, myristyl, tridecyl, lauryl, etc., radicals. The lower aliphatic hydrocarbon radicals which, in Formula I, are represented by the symbol $R_2$, are straight chain or branched chain lower alkyl, alkenyl or alkynyl groups. Examples of such groups are methyl, ethyl, propyl, isopropyl, butyl, isobutyl, hexyl, vinyl, β-methylallyl, γ,γ-dimethylallyl, propenyl, propargyl, etc., radicals. The preferred products of the invention, however, have an allyl group of the $R_2$ substituent. The β-bromoallyl group is representative of the halogen-substituted lower aliphatic hydrocarbon radicals which may be present as the $R_2$ substituent of the compounds of the invention. However, halogen-substituted alkenyl groups, other than the β-bromoallyl group, as well as halogen-substituted alkyl and halogen-substituted alkynyl groups, may be present as the $R_2$ substituent of the present compounds. Cycloalkyl, cycloalkenyl and cycloalkynyl groups are the cyclo-lower aliphatic hydrocarbon radicals which, in Formua I, are represented also by the symbol $R_2$. Examples of such groups are cyclohexyl, cyclohexen-(2)-yl, etc. radicals. However, the compounds of the invention can contain cycloalkyl groups, other than the cyclohexyl radical and cycloalkenyl groups other than cyclohexen-(2)-yl, as well as cycloalkynyl groups as the $R_2$ substituent. Furthermore, as indicated heretofore, the symbol $R_2$ represents, also, halogen-substituted cycloalkyl, halogen-substituted cycloalkenyl and halogen-substituted cycoalkynyl substituents.

The process by which the novel compounds of this invention are produced comprises condensing thiourea with a compound having the formula:

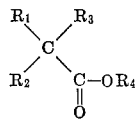

in which $R_3$ represents a cyano or a carbalkoxy group; $R_4$ represents a lower alkyl group; and in which $R_1$ and $R_2$ have the same meaning as in Formula I.

Where, however, thiourea is condensed with a compound of Formula II which contains a cyano group as the $R_3$ substituent, the process includes, also, the step of hydrolyzing the condensation product, that is, the 4-imino-thiobarbituric acid, thus obtained.

The starting materials of Formula II are partly known compounds which can be produced from known compounds by methods disclosed in the art. One such method comprises, for example, alkenylating and/or alkylating a dialkyl malonate or a cyanoacetic acid alkyl ester. A preferred class of the starting materials used in the practice of the invention are the allylalkyl malonic acid diethyl esters. This class of compounds can be produced by first condensing a malonic acid diethyl ester with an alkyl halide, for example, an alkyl bromide, in the presence of a sodium alkoxide to form an alkyl malonic acid diethyl ester. The latter compound, in the form of its sodium salt, is reacted with allyl bromide, using diethyl carbonate as the solvent.

A convenient method for carrying out the condensation reaction of the present invention comprises reacting the starting materials in a suitable organic solvent, for example, in a lower alkanol such as methanol, ethanol, etc., in the presence of an alkaline condensation agent. One can use, for example, a sodium alkoxide, such as sodium methoxide, sodium ethoxide, etc., as the alkaline condensation agent. It is advantageous to effect the condensation at an elevated temperature, for example, at the boiling point of reaction mixture. However, the reaction can be carried out, also, at lower temperatures, if desired. The condensation can be effected, conveniently, at a temperature within the range from about 50° C. to about 70° C. The reaction time varies within the range of from about 30 minutes to about 3 hours, or even longer, depending upon the temperature employed and the reactants in use. The thiobarbituric acid, which is formed during the condensation reaction, is set free through the addition of an acid, for example, a mineral acid or an organic acid such as acetic acid, either after having diluted the reaction mixture with water or after having distilled off the solvent and taken up the residue in water. The thiobarbituric acid is isolated from the reaction mixture by filtration or by extraction with an organic solvent.

Where a cyano-substituted compound (a compound of Formula II in which $R_3$ is a cyano group) is used as the starting material in the practice of this invention, the product which is obtained when that compound is condensed with thiourea is a 4-imino-thiobarbituric acid. The latter compound is converted into the desired thiobarbituric acid of Formula I by treating the 4-imino compound with a mineral acid such as hydrochloric acid, preferably using an amount of acid which is equivalent to the 4-imino-thiobarbituric acid. For example, the hydrolysis can be accomplished by heating the 4-imino-thiobarbituric acid in an equivalent amount of dilute aqueous hydrochloric acid at reflux temperature.

The substituted thiobarbituric acids of this invention can be crystallized from organic solvents. Moreover, due to their acidic properties, these acids can be converted into suitable metal salts, for example, into alkali metal salts, such as sodium salts, or into alkaline earth metal salts, such as calcium salts. The alkali metal salts can be prepared, for example, by first dissolving the substituted thiobarbituric acid in an alcohol, such as methanol, ethanol etc., and subsequently adding to the solution thus formed, an alkali metal alkoxide or an alkali metal hydroxide. The alkali metal salt of the substituted thiobarbituric acid can then be precipitated by the addition of a suitable solvent. The calcium salts of the substituted barbituric acids can be formed from the corresponding sodium salts, for example, by reaction with calcium chloride.

The substituted thiobarbituric acids of this invention, as well as their medicinally acceptable alkali metal and alkaline earth metal salts, possess valuable therapeutic and prophylactic properties against virus infections, for example, against influenza viruses. Such compounds, in the form of pharmaceutical preparations which contain the acid, or a metal salt thereof, in admixture with pharmaceutical carriers, can be used as medicaments either for enteral, for example, oral or parenteral administration. The carriers used in producing these pharmaceutical preparations may be organic or inorganic in nature. Moreover, they may be solids or liquids. For example, in producing these pharmaceutical preparations, one may employ inert materials, that is, substances which do not react with the thiobarbituric acid, such as water, gelatin, lactose, starches, magnesium stearate, talc, vegetable oils, gums, polyalkylene glycols, petroleum jelly, or any other such adjuvant, conventionally used in the preparation of medicaments. The pharmaceutical preparations of this invention may be in solid form, for example, in the form of tablets, dragees, suppositories, or capsules. Moreover, the pharmaceutical preparations of this invention may be in liquid form, for example, in the form of solutions, emulsions or suspensions. If desired, these preparations can be sterilized and/or they may contain auxiliary substances such as preservatives, stabilizers, wetting or emulsifying agents, salts for varying osmotic pressure or buffers. Moreover, these preparations can also contain other therapeutically active ingredients in admixture with the presently described thiobarbituric acids.

For a fuller understanding of the nature and objects of this invention, reference may be had to the following examples which are given merely as further illustrations of the invention and are not to be construed in a limiting sense.

*Example 1*

In this example, 16.3 grams of sodium were dissolved in 162 ml. of absolute methanol. To this solution there was added 23.2 grams of thiourea. During the addition of thiourea, the reaction mixture was continuously stirred. When the dissolution of the thiourea in the solvent was complete, 80.0 grams of allyl-myristyl-malonic acid diethyl ester (boiling point 170°/0.025 mm.) were added. The reaction mixture was stirred at a bath temperature of 60° C. until a sample thereof was found to be completely soluble in water. This occurred after the reaction mixture had been heated and stirred for a period of about one hour. The mixture was thereafter poured onto ice, and sufficient acetic acid was added to adjust the mixture to pH of about 5.0. The acidified reaction mixture was subsequently extracted with ether. The ether layer was separated, washed with sodium carbonate solution and saturated sodium chloride solution and subsequently dried and concentrated. The viscous oily residue which remained was dissolved in petroleum ether (B.P. 60°–90° C.), with heating. This solution was filtered and then cooled, following which 5-allyl-5-myristyl-2-thiobarbituric acid, of melting point 78°–79° C., crystallized out.

The following named compounds were also prepared by the procedure described in the immediately preceding paragraph:

By the condensation of thiourea with allyl-undecyl-malonic acid diethyl ester (boiling point 170° C./0.15 mm.); 5-allyl-5-undecyl-2-thiobarbituric acid (melting point 84°–86° C.) was obtained.

By the condensation of thiourea with allyl-lauryl-malonic acid diethyl ester (boiling point 157° C./0.15 mm.); 5-allyl-5-lauryl-2-thiobarbituric acid (melting point 68°–69° C.) was obtained.

By the condensation of thiourea with allyl-tridecyl-malonic acid diethyl ester (boiling point 170° C./0.02 mm.); 5-allyl-5-tridecyl-2-thiobarbituric acid (melting point 68°–70° C.) was obtained.

By the condensation of thiourea with allyl-pentadecyl-malonic acid diethyl ester (boiling point 175° C./0.07 mm.); 5-allyl-5-pentadecyl-2-thiobarbituric acid (melting point 74°–75° C.) was obtained.

By the condensation of thiourea with allyl-cetyl-malonic acid diethyl ester (boiling point 190° C./0.2 mm.); 5-allyl-5-cetyl-2-thiobarbituric acid (melting point 69°–710 C.) was obtained.

By the condensation of thiourea with methyl-myristyl-malonic acid diethyl ester (boiling point 177° C./0.3 mm.); 5-methyl-5-myristyl-2-thiobarbituric acid (melting point 100°–104° C.) was obtained.

By the condensation of thiourea with n-butyl-myristyl-malonic acid diethyl ester (boiling point 174° C./0.1 mm.); 5-n-butyl-5-myristyl-2-thiobarbituric acid (melting point 41°–43° C.) was obtained.

By the condensation of thiourea with n-propyl-myristyl-malonic acid diethyl ester (boiling point 155° C./0.07 mm.); 5-n-propyl-5-myristyl-2-thiobarbituric acid (melting point 69°–71° C.) was obtained.

By the condensation of thiourea with isobutyl-myristyl-malonic acid diethyl ester (boiling point 153° C./0.02 mm.); 5-isobutyl-5-myristyl-2-thiobarbituric acid (melting point 75°–77° C.) was obtained.

By the condensation of thiourea with β-methylallyl-myristyl-malonic acid diethyl ester (boiling point 170 C./0.02 mm.); 5-β-methylallyl-5-myristyl-2-thiobarbituric acid (melting point 83°–85° C.) was obtained.

By the condensation of thiourea with propargyl-myristyl-malonic acid diethyl ester (boiling point 186° C./0.25 mm.); 5-propargyl-5-myristyl-2-thiobarbituric acid (melting point 103°–105° C.) was obtained.

By the condensation of thiourea with cyclohexyl-myristyl-malonic acid diethyl ester (boiling point 200° C./0.4 mm.); 5 - cyclohexyl - 5-myristyl - 2 - thiobarbituric acid (melting point 58°–60° C.) was obtained.

By the condensation of thiourea with β-bromoallyl-myristyl-malonic acid diethyl ester (boiling point 190° C./0.07 mm.); 5-β-bromoallyl-5-myristyl-2-thiobarbituric acid (melting point 90°–91° C.) was obtained.

By the condensation of thiourea with cyclohexen-(2)-yl-myristyl-malonic acid diethyl ester (boiling point 195° C./0.04 mm.); 5-cyclohexen-(2)-yl-5-myristyl-2-thiobarbituric acid (melting point 61°–64° C.) was obtained.

*Example 2*

In this example, 4.6 grams of sodium were dissolved in 100 ml. of absolute ethanol. To this solution there was added 8.4 grams of thiourea at a temperature of 40° C. The reaction mixture was stirred continuously until the solution was complete. Thereafter, 32.1 grams of α-allyl-α-cyano-myristic acid ethyl ester (boiling point 157° C./0.1 mm.) were added thereto. The reaction mixture was stirred for a period of about 24 hours at a temperature within the range of from about 60° C. to 80° C. At the end of that period of time, the mixture was poured onto ice, acidified with acetic acid, and extracted with ether. The ether solution was washed with water, dried over sodium sulfate and concentrated. The residue, upon recrystallization from ethanol, yielded 5-allyl-5-lauryl-2-thio-4-imino-barbituric acid melting at 228° C.–230° C., with decomposition.

2.35 grams of the 5-allyl-5-lauryl-2-thio-4-imino-barbituric acid, prepared as described in the preceding paragraph, were heated under reflux for 48 hours in a mixture of 6.4 ml. of water and 7.0 ml. of 1 N hydrochloric acid. After cooling, ether was added to the reaction mixture. The ether layer was separated, washed with sodium bicarbonate solution until neutral and, subsequently, it was dried and concentrated. The residue was crystallized from petroleum ether (boiling point 60° C.–90° C.). There was obtained, in a practically theoretical yield, 5-allyl-5-lauryl-2-thiobarbituric acid melting at 68° C.–69° C.

Example 3

In this example, 50 grams of 5-allyl-5-myristyl-2-thiobarbituric acid, 10 grams of fumed silicon dioxide, 13.9 grams of corn starch, 1.0 gram of talc, and 0.1 gram of magnesium stearate were thoroughly mixed. The mixture, thus obtained, was compressed, by conventional means, into tablets of 750 mg. weight.

Example 4

50 grams of 5-allyl-5-pentadecyl-2-thiobarbituric acid, 10 grams of fumed silicon dioxide, 13.9 grams of corn starch, 1.0 gram of talc, and 0.1 gram of magnesium stearate were intimately admixed. Subsequently, the mixture was compressed, by conventional means, into tablets of 750 mg. weight.

Example 5

50 grams of 5-n-propyl-5-myristyl-2-thiobarbituric acid, 10 grams of fumed silicon dioxide, 13.9 grams of corn starch, 1.0 gram of talc, and 0.1 gram of magnesium stearate were intimately admixed. Thereafter, the mixture, thus obtained, was compressed, by conventional means, into tablets of 750 mg. weight.

We claim:

1. A heterocyclic compound selected from the group consisting of members having the formula:

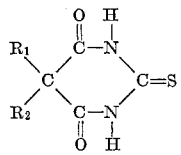

in which
  $R_1$ is an alkyl group having from 11 to 18 carbon atoms, inclusive; and in which
  $R_2$ is a propargyl radical
and medicinally acceptable metal salts thereof.

2. A heterocyclic compound selected from the group consisting of members having the formula:

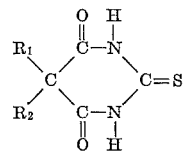

in which
  $R_1$ is an alkyl group having from 11 to 18 carbon atoms, inclusive; and in which
  $R_2$ is a halogen-substituted alkenyl radical of up to 5 carbon atoms
and medicinally acceptable metal salts thereof.

3. A heterocyclic compound selected from the group consisting of members having the formula:

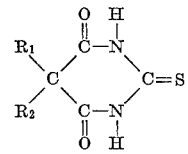

in which
  $R_1$ is an alkyl group having from 11 to 18 carbon atoms, inclusive; and in which
  $R_2$ is a cyclo-lower alkyl group
and medicinally acceptable metal salts thereof.

4. A heterocyclic compound selected from the group consisting of members having the formula:

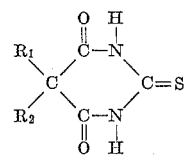

in which
  $R_1$ is an alkyl group having from 11 to 18 carbon atoms, inclusive; and in which
  $R_2$ is a cyclo-lower alkenyl group
and medicinally acceptable metal salts thereof.

5. 5-allyl-5-pentadecyl-2-thiobarbituric acid.
6. 5-allyl-5-myristyl-2-thiobarbituric acid.
7. 5-allyl-5-tridecyl-2-thiobarbituric acid.
8. 5-n-propyl-5-myristyl-2-thiobarbituric acid.

9. A heterocyclic compound selected from the group consisting of members having the formula:

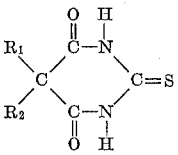

in which
  $R_1$ is myristyl; and in which
  $R_2$ is an alkyl radical of from 1 to 6 carbon atoms
and medicinally acceptable metal salts thereof.

References Cited by the Examiner

UNITED STATES PATENTS

| | | | |
|---|---|---|---|
| 2,153,730 | 4/1939 | Volwiler | 260—260 |
| 2,219,543 | 10/1940 | Cope | 260—260 |
| 2,527,293 | 10/1950 | Bahner | 260—260 |
| 2,744,900 | 5/1956 | Rappe et al. | 260—260 X |
| 2,802,827 | 8/1957 | Zima et al. | 260—260 X |
| 2,808,408 | 10/1957 | Taub | 260—260 |
| 2,868,690 | 1/1959 | Martin et al. | 260—257 |
| 2,887,487 | 5/1959 | Henecka et al. | 260—260 X |
| 2,899,435 | 8/1959 | Blandstrom | 260—260 |

FOREIGN PATENTS 510,543  8/1939  Great Britain.

OTHER REFERENCES

Mizuma et al.: Chemical Abstracts, vol. 55, page 12414, June 26, 1961. (Abstract of Mizuma et al., Yakugaku Zasshi, vol. 81, pages 40–43, 1961.)

Tatsumi et al.: Chemical Abstracts, vol. 54, pages 14279–14280, July 25, 1960. (Abstract of Japanese Patent 5122/59, dated June 19, 1959.)

Skinner et al.: Journ. American Chem. Soc., vol. 63, pages 2993–2994, 1941.

Journ. Amer. Med. Assoc., pg. 466, May 24, 1958.

Burger: Medicinal Chemistry, 2nd ed., pages 77–78, by Interscience Publishers, Inc., N.Y., 1960.

ALEX MAZEL, *Primary Examiner.*

NICHOLAS S. RIZZO, HENRY R. JILES, *Examiners.*

J. W. ADAMS, *Assistant Examiner.*